(12) United States Patent
Shigeta et al.

(10) Patent No.: US 6,752,742 B2
(45) Date of Patent: Jun. 22, 2004

(54) POWER DISTRIBUTION METHOD AND POWER DISTRIBUTION CONTROL APPARATUS FOR VEHICLE

(75) Inventors: Ryouhei Shigeta, Kariya (JP); Tsuyoshi Murakami, Kariya (JP); Hideshi Hiruta, Hiroshima-ken (JP); Hisao Fumoto, Hiroshima-ken (JP); Masashi Oda, Hiroshima-ken (JP)

(73) Assignees: Toyoda Koki Kabushiki Kaisha, Kariya (JP); Mazda Motor Corporation, Aki-gun (JP)

( * ) Notice: Subject to any disclaimer, the term of this patent is extended or adjusted under 35 U.S.C. 154(b) by 0 days.

(21) Appl. No.: 10/284,351

(22) Filed: Oct. 31, 2002

(65) Prior Publication Data
US 2003/0109356 A1 Jun. 12, 2003

(30) Foreign Application Priority Data
Oct. 31, 2001 (JP) ......................... 2001-334766

(51) Int. Cl.[7] ......................... F16H 59/64; F16H 59/72; F16H 59/78
(52) U.S. Cl. ............................. 477/98; 180/248; 701/69
(58) Field of Search ....................... 701/65, 64; 477/98, 477/35, 76; 180/248, 249

(56) References Cited
U.S. PATENT DOCUMENTS

| | | | | |
|---|---|---|---|---|
| 3,923,113 A | * | 12/1975 | Pagdin | ........................ 180/249 |
| 4,921,065 A | * | 5/1990 | Hamada et al. | ............. 180/245 |
| 5,065,836 A | * | 11/1991 | Hamada et al. | ............. 180/245 |
| 5,803,197 A | * | 9/1998 | Hara et al. | ................... 180/248 |

FOREIGN PATENT DOCUMENTS

| | | | | |
|---|---|---|---|---|
| JP | 02031935 A | * | 2/1990 | ........... B60K/17/35 |
| JP | 04339028 A | * | 11/1992 | ........... B60K/23/04 |

* cited by examiner

Primary Examiner—Tisha D. Lewis
(74) Attorney, Agent, or Firm—Oblon, Spivak, McClelland, Maier & Neustadt, P.C.

(57) ABSTRACT

A vehicle has a transmission apparatus that changes the distribution of power transmitted from a power source to a plurality of wheels. The method for distributing power of the vehicle includes detecting the temperature of a part located on a power transmission path between the power source and a wheel to which power is transmitted from the power source through the transmission apparatus, the heat of the part being increased as the power distribution ratio is increased; determining that the current state is a specific state in which the detected temperature reaches a previously set first reference temperature; and controlling the transmission apparatus to lower the power distribution ratio to the wheel from the transmission apparatus when the current state is determined to the specified state.

18 Claims, 5 Drawing Sheets

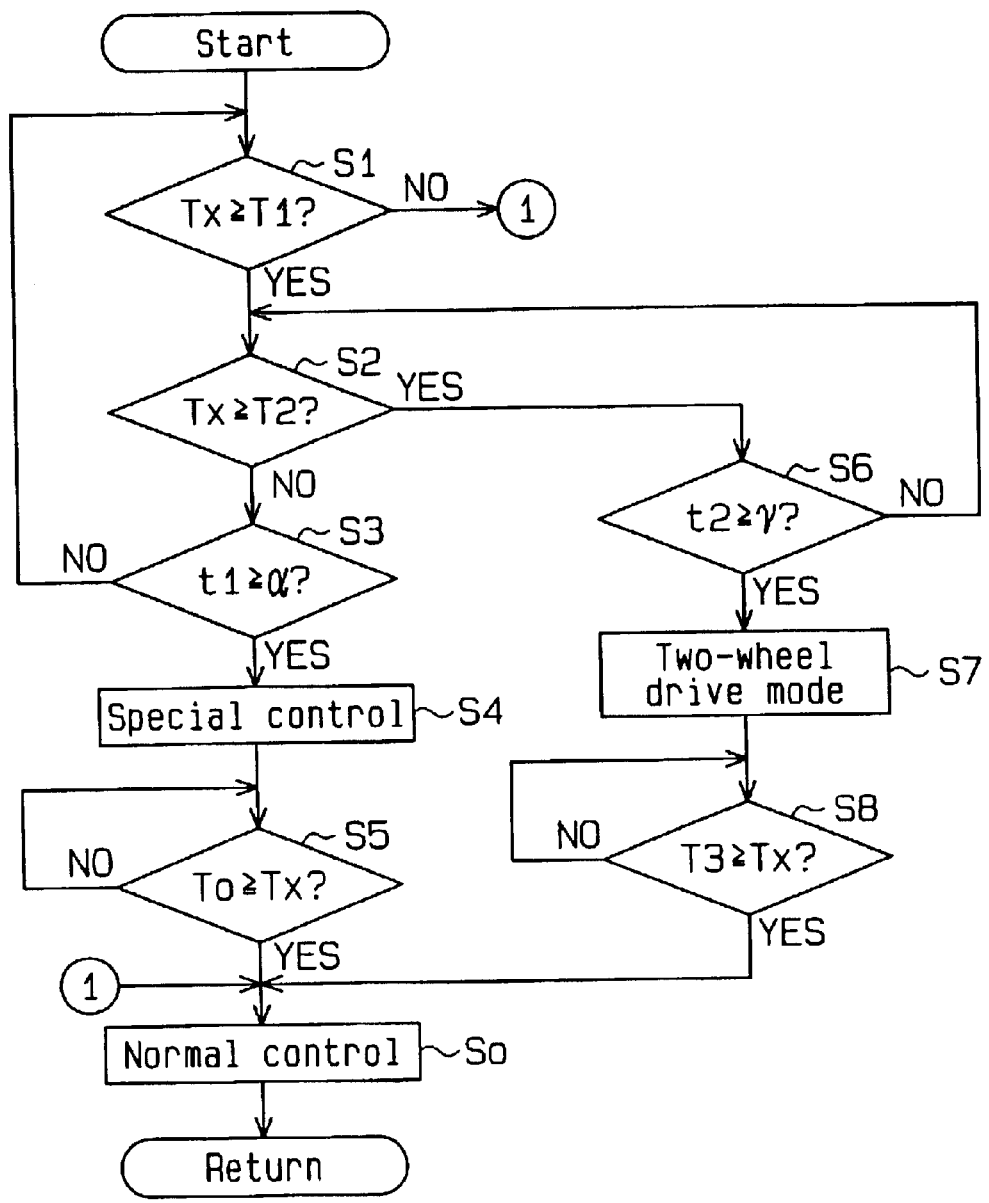

Fig.4(a)

| Vehicle Speed | Throttle Opening Degree | | | | | |
|---|---|---|---|---|---|---|
| | 0 | θ1 | θ2 | θ3 | θ4 | - |
| 0 | R00 | R01 | R02 | R03 | R04 | - |
| V1 | R10 | R11 | R12 | R13 | R14 | - |
| V2 | R20 | R21 | R22 | R23 | R24 | - |
| V3 | R30 | R31 | R32 | R33 | R34 | - |
| V4 | R40 | R41 | R42 | R43 | R44 | - |
| ⋮ | ⋮ | ⋮ | ⋮ | ⋮ | ⋮ | |

Fig.4(b)

| Vehicle Speed | Throttle Opening Degree | | | | | |
|---|---|---|---|---|---|---|
| | 0 | θ1 | θ2 | θ3 | θ4 | - |
| 0 | K00 | K01 | K02 | K03 | K04 | - |
| V1 | K10 | K11 | K12 | K13 | K14 | - |
| V2 | K20 | K21 | K22 | K23 | K24 | - |
| V3 | K30 | K31 | K32 | K33 | K34 | - |
| V4 | K40 | K41 | K42 | K43 | K44 | - |
| ⋮ | ⋮ | ⋮ | ⋮ | ⋮ | ⋮ | |

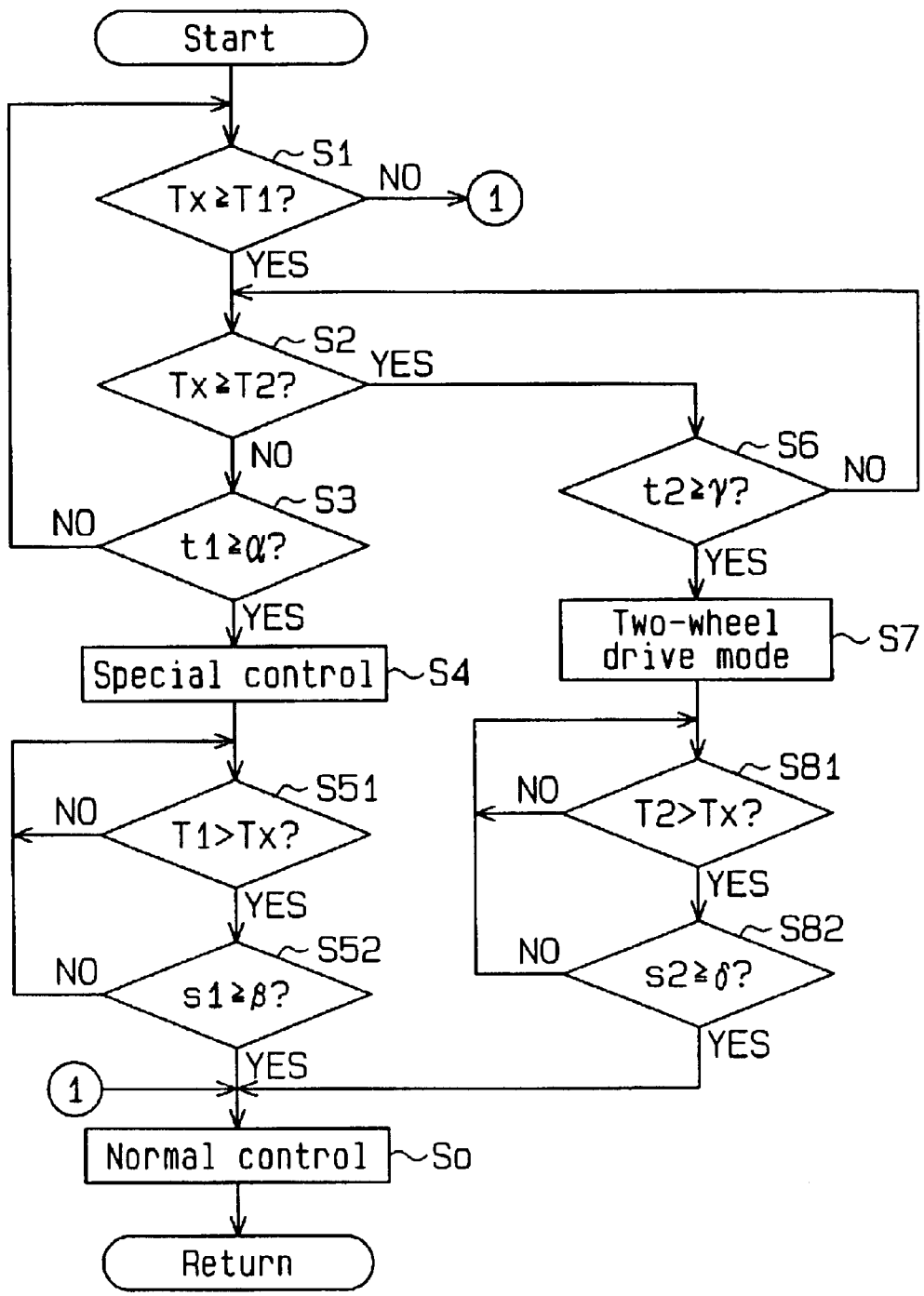

POWER DISTRIBUTION METHOD AND POWER DISTRIBUTION CONTROL APPARATUS FOR VEHICLE

BACKGROUND OF THE INVENTION

The present invention relates to a power distribution method and a power distribution control apparatus for vehicles.

A standby four-wheel drive system is known in the art. The standby four-wheel drive system controls distribution of power to the front wheels and the rear wheels according to the driving state of a vehicle. When all the four wheels of a four-wheel drive vehicle are being driven, some of the power generated by the engine is transmitted to the rear wheels by a transmission apparatus, which is capable of changing the power distribution ratio to the front wheels and the rear wheels.

A typical transmission apparatus includes an electromagnetic clutch mechanism of a multi-plate wet type. The frictional force among the clutch disks of the electromagnetic clutch mechanism is varied in accordance with the amount of the current supplied to a magnet coil. As the frictional force is increased, the ratio of the power distribution to the rear wheels is increased.

When the power distribution to the rear wheels is increased, the load on the transfer located between the engine and the transmission apparatus, and the load on the rear differential located between the transmission apparatus and the rear wheels are increased. Accordingly, the temperature of the oil lubricating the transfer and the temperature of the oil lubricating the rear differential are likely to increase. When excessively heated, the lubrication performance of the lubricating oil deteriorates.

SUMMARY OF THE INVENTION

Accordingly, it is an objective of the present invention to prevent excessive temperature increases at a part that is heated as the ratio of power distribution to vehicle rear wheels is increased.

To achieve the above objects, one aspect of the present invention provides a method for distributing power of a vehicle. The vehicle has a transmission apparatus that changes the distribution ratio of power transmitted from a power source to a plurality of wheels. The method includes detecting the temperature of a part located on a power transmission path between the power source and a wheel to which power is transmitted from the power source through the transmission apparatus, the heat of the part being increased as the power distribution ratio is increased; determining that the current state is a specific state in which the detected temperature reaches a previously set first reference temperature; and controlling the transmission apparatus to lower the power distribution ratio to the wheel from the transmission apparatus when the current state is determined to the specified state.

Another aspect of the present invention provides a power distribution control apparatus for a vehicle. The control apparatus includes a transmission apparatus that changes the distribution ratio of power transmitted from a power source to a plurality of wheels. The control apparatus has a detector and an electronic control unit. The detector detects the temperature of a part located on a power transmission path between the power source and a wheel to which power is transmitted from the power source through the transmission apparatus, the heat of the part being increased as the power distribution ratio at the transmission apparatus is increased. The control unit controls the power distribution ratio at the transmission apparatus thereby controlling the distribution ratio of power to the wheels. When the current state is a specific state in which the temperature detected by the detector is equal to or higher that a previously set first reference temperature, the control unit controls the transmission apparatus to decrease the power distribution ratio.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a flowchart showing a power distribution control of the first embodiment;

FIG. 4(*a*) is a map of data used in the power distribution of a normal control according to the first embodiment;

FIG. 4(*b*) is a map of data used in the power distribution of a specified control according to the first embodiment; and FIG. 5 is a flowchart showing a power distribution control according to a second embodiment.

DETAILED DESCRIPTION OF THE PREFERRED EMBODIMENTS

A four-wheel drive vehicle according to a first embodiment of the present invention will now be described with reference to FIGS. 1 to 4(*b*). The vehicle is normally in two-wheel drive. Specifically, the engine drives the front wheels in normal circumstances.

Figure 1:
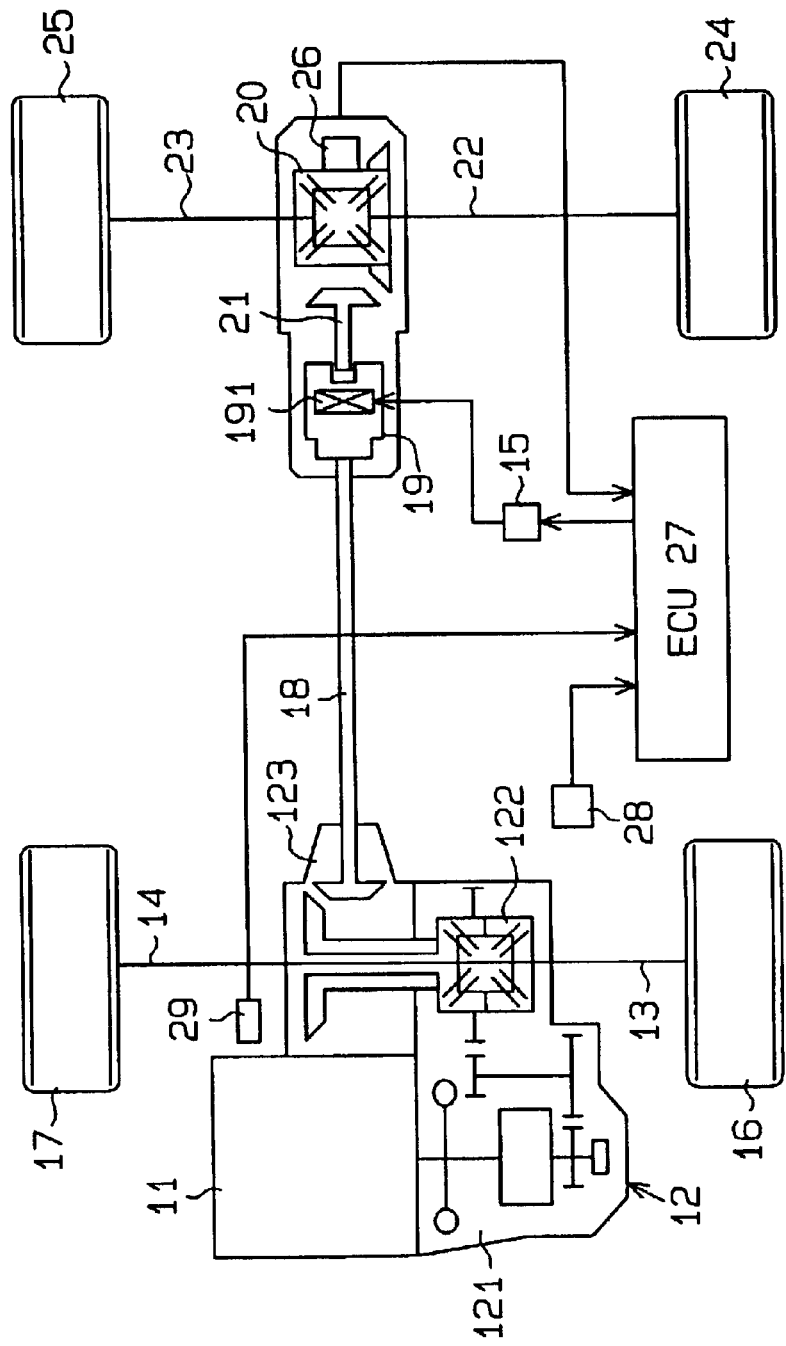
FIG. 1 is a schematic plan view showing a four-wheel drive vehicle according to a first embodiment of the present invention.

As shown in FIG. 1, the four-wheel drive vehicle has a drive source, which is an internal combustion engine 11 in this embodiment, and a transaxle 12. The transaxle 12 includes a transmission 121, a front differential 122, and a transfer 123. First and second front axles 13, 14 are coupled to the front differential 122. A left front wheel 16 is coupled to the first front axle 13. A right front wheel 17 is coupled to the second front axle 14. Power of the engine 11 is transmitted to the front wheels 16, 17 by the transmission 121, the front differential 122, and the front axles 13, 14.

One end of a propeller shaft 18 is coupled to the transfer 123. The other end of the propeller shaft 18 is coupled to an electromagnetic clutch mechanism 19 of a multi-plate wet type. Power of the engine 11 is transmitted to the clutch mechanism 19 by the transmission 121, the transfer 123, and the propeller shaft 18. The clutch mechanism 19 is coupled to a rear differential 20 with a drive pinion 21. First and second rear axles 22, 23 are coupled to the rear differential 20. A left rear wheel 24 is coupled to the first rear axle 22. A right rear wheel 25 is coupled to the second rear axle 23. In this embodiment, the transfer 123, the propeller shaft 18, the clutch mechanism 19, the drive pinion 21, the rear differential 20, and the rear axles 22, 23 form a power transmission system, which extends from the engine 11 to the rear wheels 24, 25.

The clutch mechanism 19 includes an electromagnetic coil 191 and clutch disks (not shown), which are coupled to and separated from one another. When the electromagnetic coil 191 is excited, the clutch disks are engaged, and power is transmitted from the propeller shaft 18 to the drive pinion 21. The power transmitted to the drive pinion 21 is transmitted to the rear wheels 24, 25 through the rear differential 20 and the rear axles 22, 23.

The distribution ratio of the power transmitted from the engine 11 to the drive pinion 21 through the propeller shaft 18 is determined by the frictional force among the clutch disks. The power transmitted to the drive pinion 21 is increased as the frictional force among the clutch disks is increased. The frictional force among the clutch disks is determined by the amount of the current supplied to the electromagnetic coil 191. Therefore, if the current supplied to the electromagnetic coil 191 is controlled, the power distribution ratio to the front wheels 16, 17 and the rear wheels 24, 25 will be controlled. The clutch mechanism 19 is a transmission apparatus capable of varying the ratio of the power transmitted from the engine 11 to the front wheels 16, 17 and the rear wheels 24, 25.

A temperature detecting device, which is a temperature sensor 26 in this embodiment, is attached to the rear differential. The temperature sensor 26 detects the temperature of lubricating oil that is stored in and lubricates the rear differential 20. The temperature sensor 26 is connected an electronic control unit (ECU) 27 for distributing power. The information detected by the temperature sensor 26 is sent to the ECU 27. The ECU 27 is connected to a vehicle speed sensor 28 and a throttle opening sensor 29. The value detected by the vehicle speed sensor 28 and the value detected by the throttle opening sensor 29 are sent to the ECU 27.

Figure 2:
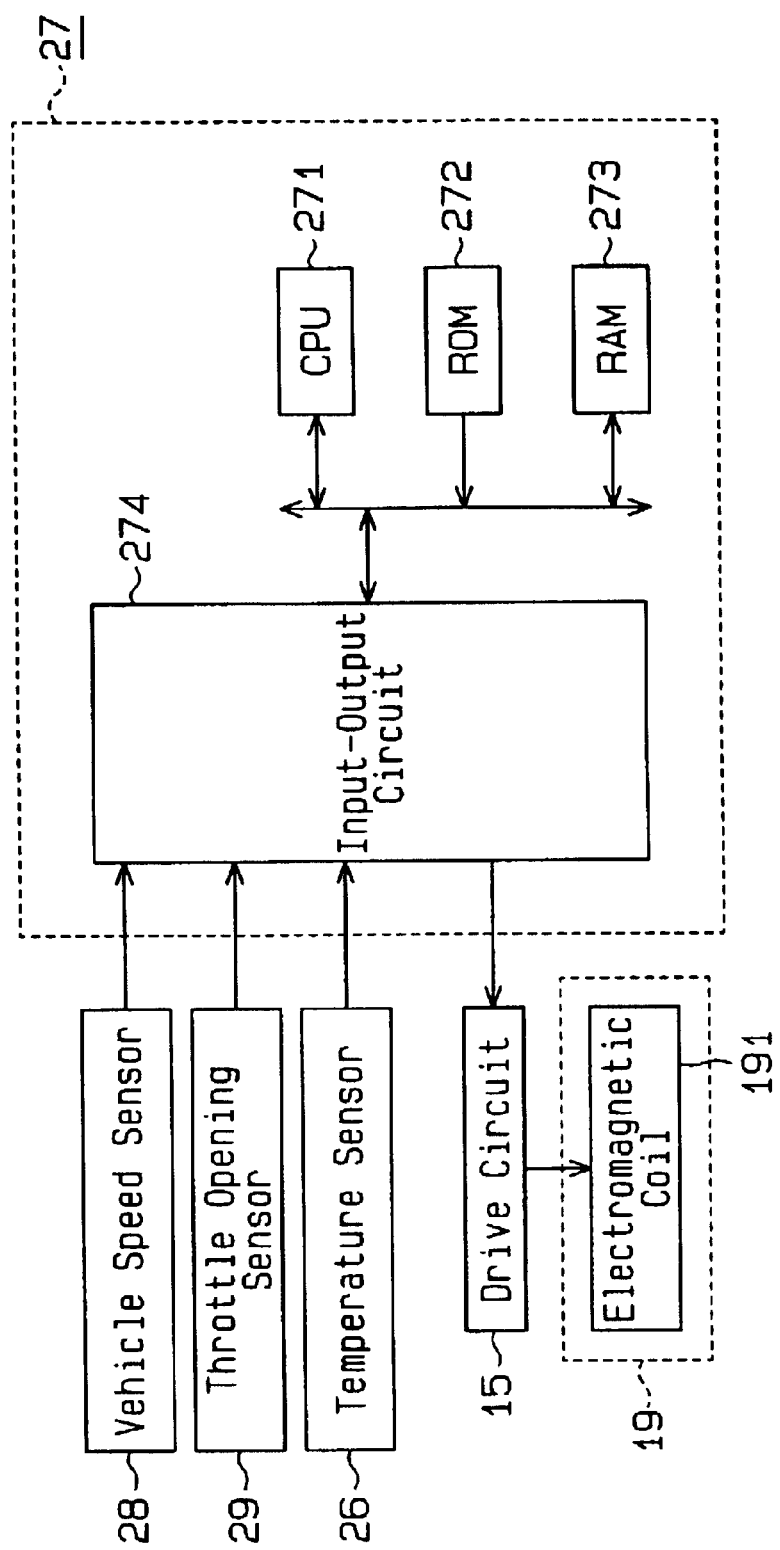
FIG. 2 is a diagram showing a control circuit of the first embodiment.

As shown in FIG. 2, the ECU 27 includes a CPU 271, a ROM 272, a RAM 273, and input-output circuit 274. The electromagnetic coil 191 of the clutch mechanism 19 is electrically connected to a drive circuit 15. The drive circuit 15, the temperature sensor 26, the vehicle speed sensor 28, and the throttle opening sensor 29 are connected to the input-output circuit 274. The ECU 27 controls the current to the electromagnetic coil 191 by means of the drive circuit 15. The current is duty controlled.

As the duty ratio is increased, the frictional force of the clutch mechanism 19 is increased. Accordingly, ratio of power transmission at the clutch 19 is increased. In other words, the power distribution ratio to the rear wheels 24, 25 is increased. When the duty ratio is 100%, the power distribution ratio is maximized. When the duty ratio is 0%, the power distribution ratio is zero. As the power distribution ratio to the rear wheels 24, 25 is increased, the load on the rear differential 20 is increased. As a result, the temperature of oil lubricating the rear differential 20 is increased. As the power distribution ratio to the rear wheels 24, 25 is decreased, the load on the rear differential 20 is decreased. As a result, the temperature of oil lubricating the rear differential 20 is decreased.

The ROM 272 stores a control program and map data for controlling the current to the electromagnetic coil 191 of the clutch mechanism 19. A flowchart of FIG. 3 schematically shows a control program stored in the ROM 272. The CPU 271 executes various computations for controlling the current to the clutch mechanism 19 based on a control program and map data stored in the ROM 272. The RAM 273 temporarily stores computation results of the CPU 271 and stores various data.

The map data stored in the ROM 272 is related to the duty ratio of the current supplied to the electromagnetic coil 191. The map data is defined by using the throttle opening degree and the vehicle speed as parameters. The map data includes a first map D1 shown in FIG. 4($a$) and a second map D2 shown in FIG. 4($b$). The first map D1 is used in normal conditions and the second map D2 is used in a specific state. As shown in FIGS. 4($a$) and 4($b$), V1, V2, V3, V4, . . . show the vehicle speed, and θ1, θ2, θ3, θ4, . . . show the throttle opening degree. R00, R10, R20 . . . , R01, R11, R21 . . . , (hereinafter referred to as Rmn, in which m and n are integers equal to or greater than zero), and K00, K10, K20 . . . , K01, K11, K21 (hereinafter referred to as Kmn, in which m and n are integers equal to or greater than zero) represent duty ratios (see FIG. 4($b$)). When Rmn is not zero, a formula Rmn>Kmn is satisfied.

The ECU 27 selects one of the first and second maps D1, D2 based on the information detected by the temperature sensor 26. The ECU 27 controls the current to the electromagnetic coil 191 based on the information detected by the vehicle speed sensor 28, the information detected by the throttle opening sensor 29, and the map data.

The power distribution control will now be described with reference to the flowchart of FIG. 3. The ECU 27 samples the detected information from the temperature sensor 26, the vehicle speed sensor 28, and the throttle opening sensor 29 at predetermined time intervals.

In step S1, the ECU 27 compares the temperature Tx detected by the temperature sensor 26 with a first reference temperature T1. The first reference temperature T1 is an index to indicate that the temperatures of the oil lubricating the rear differential 20 above it are undesirable. The first reference temperature T1 is obtained through experiments or is theoretically computed. The first reference temperature T1 is stored in the ROM 272. If a formula Tx<T1 is satisfied, the ECU 27 proceeds to step So and performs a normal control by using the first map D1. If a formula Tx≧T1 is satisfied, the ECU 27 proceeds to step S2 and compares the detected temperature Tx with a predetermined second reference temperature T2 (T2>T1). The second reference temperature T2 is an index to indicate that a temperature increase of the oil lubricating the rear differential 20 above it likely to cause a lubrication failure. The second reference temperature T2 is obtained through experiments or is theoretically computed. The second reference temperature T2 is stored in the ROM 272. In step S3, the ECU 27 compares a first duration t1 in which the formula T2>Tx≧T1 is satisfied with a first reference duration α. The first reference duration α is stored in the ROM 272. If a formula t1<α is satisfied, the ECU 27 returns to step S1. If a formula t1≧α is satisfied, the ECU 27 proceeds to step S4 and performs the specified control by using the second map D2.

During the specified control using the second map D2, the ECU 27 compares the detected temperature Tx with a first return permission temperature To in step S5. The first return permission temperature To is an index to indicate that the control is permitted to return to the normal control after the temperature of the lubricating oil drops from the state represented by the formula T2>Tx≧T1. The first return permission temperature To is obtained through experiments or is theoretically computed. The first return permission temperature To is stored in the ROM 272. If a formula To≧Tx is satisfied, the ECU 27 proceeds to step So and performs the normal control by using the first map D1.

If a formula Tx≧T2 is satisfied, the ECU 27 proceeds to step S6. In step S6, the ECU 27 compares a second duration t2 in which the formula Tx≧T2 is satisfied with a second reference duration γ. If a formula t2<γ is satisfied, the ECU 2 returns to step S2. If a formula t2≧γ is satisfied, the ECU 27 proceeds to step S7. In step S7, the ECU 27 stops the current to the electromagnetic coil 191 to start the two-wheel drive, in which only the front wheels 16, 17 are driven. During the two-wheel drive, the ECU 27 compares the detected temperature Tx with a predetermined second return permission temperature T3 in step S8. The second return permission temperature T3 is an index to indicate that the control is permitted to return to the normal control when the temperature of the lubricating oil drops from the state represented by the formula Tx≧T2. The second return permission temperature T3 is obtained through experiments or is theoretically computed. The second return permission temperature T3 is stored in the ROM 272. If a formula T3≧Tx is satisfied, the ECU 27 proceeds to step So and performs the normal control by using the first map D1.

If the temperature detected by the temperature sensor 26 reaches a predetermined reference temperature, the ECU 27 decreases the power distribution ratio at the clutch mechanism 19.

This embodiment provides the following advantages.

(1-1) If the temperature of the oil lubricating the rear differential 20 has not reached the first reference temperature T1, the normal control using the first map D1 is executed. If the temperature of the oil lubricating the rear differential 20 reaches the first reference temperature T1 and this temperature state has continued over the first reference duration α, that is, if the temperature is in a specific state, the normal control in which the four wheels are driven, likely to further increase the temperature of the oil lubricating the rear differential 20.

When the specific state occurs, the control using the second map D2 is executed. When the vehicle speed and the throttle opening degree are constant, the duty ratio Kmn on the second map D2, which is not zero, is less than the duty ratio Rmn on the first map D1. Therefore, if the control is shifted from the one using the first map D1 to the one using the second map D2, the power transmission distribution ratio at the clutch mechanism 19 is lowered to the power transmission distribution ratio for the specific state. Accordingly, the power distribution ratio to the rear wheels 24, 25 is decreased. As a result, the load on the rear differential 20 is decreased, and the temperature of the oil lubricating the rear differential 20 is lowered. Such decrease in the power transmission distribution ratio prevents the oil lubricating the rear differential 20 from being excessively heated, that is, prevents the rear differential 20 from being excessively heated.

(1-2) If the temperature of the oil lubricating the rear differential 20 reaches the second reference temperature T2 and this temperature state has continued over the second reference duration γ, that is, if the temperature is in the specific state, the normal control using the first map D1 is likely to excessively heat the oil lubricating the rear differential 20.

However, in this embodiment, the current to the electromagnetic coil 191 is stopped in the specific state. Accordingly, the power transmission distribution ratio at the clutch mechanism 19 is lowered to zero, and the power distribution ratio to the rear wheels 24, 25 is lowered to zero. As a result, the load on the rear differential 20 is decreased. The state in which the power transmission distribution ratio to the clutch mechanism 19 is zero readily decreases the temperature of the rear differential 20 to the second reference temperature T2. Such decrease in the power transmission distribution ratio to zero prevents the rear differential 20 from being excessively heated, that is, prevents the oil lubricating the rear differential 20 from being excessively heated.

(1-3) The first return permission temperature To is an index to indicate that the control is permitted to return to the normal control after the temperature of the lubricating oil drops from the state represented by the formula Tx≧T1. If the control is returned to the normal control when the temperature of the lubricating oil drops below the first reference temperature T1, hunting of the lubricating oil temperature is likely to occur. That is, the lubricating oil temperature is likely to repeatedly surpass and drop blow the first reference temperature T1 in a short time. However, since the first return permission temperature To, which is lower than the first reference temperature T1, is used as an index to return the control to the normal control, such hunting is prevented.

(1-4) The second return permission temperature T3 is an index to indicate that the control is permitted to return to the normal control after the temperature of the lubricating oil drops from the state represented by the formula Tx≧T2. If the control is returned to the normal control when the temperature of the lubricating oil drops below the second reference temperature T2, hunting of the lubricating oil temperature is likely to occur. That is, the lubricating oil temperature is likely to repeatedly surpass and drop blow the second reference temperature T2 in a short time. However, since the second return permission temperature T3, which is lower than the second reference temperature T2, is used as an index to return the control to the normal control, such hunting is prevented.

(1-5) If the state in which the temperature Tx of the lubricating oil is equal to or higher than T1 and lower than T2 continues over the first reference duration α, the control is shifted from the normal control using the first map D1 to the specified control using the second map D2. If the state in which a formula T2>Tx≧T1 is satisfied continues over the first reference duration α (for example, several tens of seconds), the temperature of the lubricating oil is highly likely to increase further. Even if the temperature Tx of the lubricating oil momentarily surpasses T1, it is not certain that the lubricating oil temperature will increase further. Therefore, if the control is shifted from the normal control to the specified control as soon as the lubricating oil temperature Tx reaches T1, the shifting of the control may be meaningless. Meaningless shifting hinders the power distribution ratio from being optimized. Therefore, using the first reference duration α is effective to determine whether the lubricating oil temperature will continue to increase.

(1-6) When the lubricating oil temperature Tx is equal to or higher than T2 over the second reference duration γ, the two-wheel drive is started. If the state in which a formula Tx≧T2 is satisfied continues over the second reference duration γ (for example, several tens of seconds), the temperature of the lubricating oil is highly likely to increase further. Even if the temperature Tx of the lubricating oil momentarily surpasses T2, it is not certain that the lubricating oil temperature will increase further. Therefore, if the control is shifted from the normal control to the two-wheel drive as soon as the lubricating oil temperature Tx reaches T2, the shifting of the control may be meaningless. Meaningless shifting hinders the power distribution ratio from being optimized. Therefore, using the second reference duration γ is effective to determine whether the lubricating oil temperature will continue to increase.

The second embodiment will now be described with reference to FIG. 5. The structure of the power distribution control apparatus according to this embodiment is the same as that of the embodiment shown in FIGS. 1 to 4(b). This embodiment is different from the embodiment of FIGS. 1 to 4(b) in the control program for the power distribution.

In this embodiment, step S5 of FIG. 3 is replaced by steps S51 and S52, and step S8 of FIG. 3 is replaced by steps S81 and S82. After step S4, that is, during the specific control using the second map D2, the ECU 27 compares the detected temperature Tx with the first reference temperature T1 in step S51. If the detected temperature Tx is lower than the first reference temperature T1, the ECU 27 proceeds to step S52. In step S52, the ECU 27 compares a duration s1 of the detected temperature Tx with a predetermined third reference duration β. If a formula s1<β is satisfied, the ECU 1 returns to step S51. If a formula s1≧β is satisfied, the ECU 1 proceeds to step So. In step So, the ECU 27 performs the normal control by using the first map D1.

After step S7, that is, during the two-wheel drive, the ECU 27 compares the detected temperature Tx with the predetermined second reference temperature T2 in step S81. If the detected temperature Tx is lower than the reference temperature T2, the ECU 27 proceeds to step S82. In step S82, the ECU 27 compares a duration s2 of the detected temperature Tx with a predetermined fourth reference duration δ. If a formula s2<δ is satisfied, the ECU 2 returns to step S7. If a formula S2≧δ is satisfied, the ECU 27 proceeds to step So and shifts the control to the normal control.

The first reference duration β is determined such that hunting at the first reference temperature T1 is avoided. The second reference duration δ is determined such that hunting at the second reference temperature T2 is avoided. Therefore, in this embodiment, hunting at both reference temperatures T1 and T2 is prevented.

It should be apparent to those skilled in the art that the present invention may be embodied in many other specific forms without departing from the spirit or scope of the invention. Particularly, it should be understood that the invention may be embodied in the following forms.

The control may be immediately shifted from the normal control to the specific control when the detected temperature of the lubricating oil reaches the first reference temperature T1.

The control may be immediately shifted from the normal control to the two-wheel drive when the detected temperature of the lubricating oil reaches the second reference temperature T2.

During the specific state, in which the detected temperature of the lubricating oil is equal to or above the first reference temperature T1, the power transmission distribution ratio at the clutch mechanism 19 may be decreased to zero. That is, the current to the electromagnetic coil 191 of the clutch 19 may be stopped so that the control is shifted to the two-wheel drive.

The power distribution control may be performed based on a power distribution control program that includes steps S5, S8 of the flowchart of the embodiment shown in FIGS. 1 to 4(b) and steps S51, S81 of the flowchart of the embodiment shown in FIG. 5.

In this case, when the formula Tx≦To is satisfied or when formulas Tx<T1 and s1≧β are satisfied, the control is shifted from the specified control to the normal control. Also, when the formula Tx≦T3 is satisfied or when formulas Tx<T2 and s2≧δ are satisfied, the control is shifted from the specified control to the two-wheel drive.

As a parameter for the first and second maps, the difference (differential rotation speed) between the average rotation speed of the front wheels 16, 17 and the average rotation speed of the rear wheels 24, 25 may be used.

In this case, wheel speed sensors are needed for separately detecting the rotation speed of the front wheels 16, 17 and the rotation speed of the rear wheels 24, 25.

Temperature may be detected at the transfer 123. Specifically, the temperature of oil that is stored in and lubricates the transfer 123 may be detected.

The present invention may be applied to a FR type or RR type four-wheel-drive vehicle, which drives the rear wheels during the two-wheel drive.

The present invention may be applied to vehicles other than four-wheel-drive vehicles.

Therefore, the present examples and embodiments are to be considered as illustrative and not restrictive and the invention is not to be limited to the details given herein, but may be modified within the scope and equivalence of the appended claims.

What is claimed is:

1. A method for distributing power of a vehicle, wherein the vehicle has a transmission apparatus that changes the distribution of power transmitted from a power source to a plurality of wheels, the method comprising:

detecting the temperature of a part located on a power transmission path between the power source and a wheel to which power is transmitted from the power source through the transmission apparatus, the heat of the part being increased as the power distribution ratio is increased;

determining whether a current state of the detected temperature corresponds to a specific state in which the detected temperature has been equal to or higher than a previously set first reference temperature for a previously set first reference duration; and controlling the transmission apparatus to lower the power distribution ratio to the wheel from the transmission apparatus when the current state is determined to be the specific state.

2. The method according to claim 1, wherein, when the current state is determined to be the specific state, the power distribution ratio is decreased to a predetermined value that is greater than zero, and wherein, when the detected temperature reaches a second reference temperature that is higher than the first reference temperature, the power distribution ratio is set to zero.

3. The method according to claim 2, wherein the predetermined value is changed in accordance with the driving state of the vehicle.

4. The method according to claim 2, wherein the power distribution ratio is set to zero when the detected temperature has been equal to or higher than the second reference temperature for a previously set second reference duration.

5. The method according to claim 1, wherein detecting the temperature includes detecting the temperature of a differential located between the transmission apparatus and the wheel to which power is transmitted through the transmission apparatus.

6. The method according to claim 1, wherein detecting the temperature includes detecting the temperature of a transfer located between the power source and the transmission apparatus.

7. The method according to claim 1, further comprising controlling the transmission apparatus to return the current power distribution ratio to the power distribution ratio of the time before the power distribution ratio was decreased if, after the power distribution ratio is decreased, the detected temperature becomes a permission temperature that is lower than the first reference temperature.

8. The method according to claim 1, wherein the drive source is an engine, the engine having a throttle valve, wherein a plurality of maps for determining the power distribution ratio from the transmission apparatus to the wheels in accordance with a vehicle speed and an opening degree of the throttle valve are prepared, wherein the power distribution ratio to the wheels is changed by using a selected one of the maps, wherein the maps include a first map used in states other than the specific state and a second map used in the specific state, wherein, under the conditions with the same vehicle speed and the same throttle opening degree, the power distribution ratio based on the second map is less than the power distribution ratio based on the first map.

9. A power distribution control apparatus for a vehicle, wherein the control apparatus includes a transmission apparatus that changes the distribution of power transmitted from a power source to a plurality of wheels, the control apparatus comprising:

a detector for detecting the temperature of a part located on a power transmission path between the power source and a wheel to which power is transmitted from the power source through the transmission apparatus, the heat of the part being increased as the power distribution ratio at the transmission apparatus is increased; and an electronic control unit, wherein the control unit controls the power distribution ratio at the transmission apparatus thereby controlling the distribution ratio of power to the wheels, wherein, when a current state of the detected temperature corresponds to a specific state in which the temperature detected by the detector has been equal to or higher than a previously set first reference temperature for a previously set first reference duration, the control unit controls the transmission apparatus to decrease the power distribution ratio.

10. The apparatus according to claim 9, wherein, when the current state is determined to be the specific state, the control unit controls the transmission apparatus to decrease the power distribution ratio to a predetermined value that is greater than zero, and wherein, when the detected temperature reaches a second reference temperature that is higher than the first reference temperature, the control unit controls the transmission apparatus to set the power distribution ratio to zero.

11. The apparatus according to claim 10, wherein the predetermined value is changed in accordance with the driving state of the vehicle.

12. The apparatus according to claim 10, wherein the power distribution ratio is set to zero when the detected temperature has been equal to or higher than the second reference temperature for a previously set second reference duration.

13. The apparatus according to claim 9, wherein the control unit stores first data and second data, wherein, during the specific state, the control unit controls the transmission apparatus based on the second data, and wherein, in any state other than the specific state, the control unit controls the transmission apparatus based on the first data.

14. The apparatus according to claim 9, wherein the detector detects the temperature of a differential located between the transmission apparatus and the wheel to which power is transmitted through the transmission apparatus.

15. The apparatus according to claim 9, wherein the detector detects the temperature of a transfer located between the power source and the transmission apparatus.

16. The apparatus according to claim 9, wherein, if, after the power distribution ratio is decreased, the detected temperature becomes a permission temperature that is lower than the first reference temperature, the control unit controls the transmission apparatus to return the current power distribution ratio to the power distribution ratio of the time before the power distribution ratio was decreased.

17. The apparatus according to claim 9, wherein the drive source is an engine, the engine having a throttle valve, wherein the control unit has a plurality of maps for determining the power distribution ratio from the transmission apparatus to the wheels in accordance with a vehicle speed and an opening degree of the throttle valve are prepared, wherein the control apparatus changes the power distribution ratio to the wheels by using a selected one of the maps, wherein the maps include a first map used in states other than the specific state and a second map used in the specific state, wherein, under the conditions with the same vehicle speed and the same throttle opening degree, the power distribution ratio based on the second map is less than the power distribution ratio based on the first map.

18. A method for distributing power of a vehicle, wherein the vehicle has a transmission apparatus that changes the distribution of power from a power source to a plurality of wheels, the method comprising:

detecting the temperature of a part, the heat of which is increased as the distribution ratio of power from the power source to the wheels is increased;

decreasing the power distribution ratio to a predetermined value that is greater than zero when a current state of the detected temperature corresponds to a specific state in which the detected temperature has been equal to or higher than a first reference temperature for a previously set first reference duration; and making the power distribution ratio to zero when the detected temperature reaches a second reference temperature that is higher than the first reference temperature.

* * * * *